(12) United States Patent
Plentl, Jr.

(10) Patent No.: US 6,234,272 B1
(45) Date of Patent: May 22, 2001

(54) RELEASABLE, PORTABLE STAIRWAY FOR USE WITH A BOARDING BRIDGE

(75) Inventor: Willard G. Plentl, Jr., Wrightsville Beach, NC (US)

(73) Assignee: New Hanover Airport Authority, Wilmington, NC (US)

( * ) Notice: Subject to any disclaimer, the term of this patent is extended or adjusted under 35 U.S.C. 154(b) by 0 days.

(21) Appl. No.: 09/390,585

(22) Filed: Sep. 3, 1999

(51) Int. Cl.$^7$ .................................................. E01D 1/00
(52) U.S. Cl. .................... 182/115; 182/16; 52/183; 14/71.5
(58) Field of Search .................. 182/115, 1, 116, 182/13, 17, 15, 11, 2.1, 119, 222, 84, 16; 52/183, 184; 14/71.5, 71.1

(56) References Cited

U.S. PATENT DOCUMENTS

| | | |
|---|---|---|
| Re. 26,859 | 4/1970 | Riggles, Jr. ........................... 14/71 |
| D. 146,418 | 2/1947 | Olivarez ................................. D14/3 |
| D. 177,858 | 5/1956 | Phelps ................................... D14/3 |
| 298,212 | 5/1884 | Knight . |
| 1,215,827 | 2/1917 | Lord . |
| 1,590,317 | 6/1926 | Richards . |
| 2,362,170 | 11/1944 | Swaisgood . |
| 2,466,155 | 4/1949 | Conrad ................................... 304/29 |
| 2,512,150 | 6/1950 | Geren .................................... 121/40 |
| 2,732,118 | * 1/1956 | Reinhardt ............................. 182/116 |
| 3,060,471 | 10/1962 | Der Yuen et al. ...................... 14/71 |
| 3,263,254 | 8/1966 | Wollard et al. ........................ 14/71 |
| 3,404,417 | 10/1968 | Wollard et al. ........................ 14/71 |
| 3,451,504 | 6/1969 | Logan .................................... 182/1 |
| 3,698,511 | * 10/1972 | Dohan ................................. 182/113 |
| 3,910,264 | 10/1975 | Mahieu ................................. 182/63 |
| 3,941,337 | 3/1976 | Mölter et al. ........................ 244/129 |
| 4,572,328 | 2/1986 | Benko ..................................... 182/1 |
| 4,642,953 | * 2/1987 | DeGood ................................ 52/183 |
| 4,971,168 | 11/1990 | Stanescu ................................. 182/1 |
| 5,004,188 | 4/1991 | Donneky et al. ............. 344/137.002 |
| 5,226,204 | 7/1993 | Schoenberger et al. ............... 14/71.5 |
| 5,295,555 | 3/1994 | Strange ................................. 182/63 |
| 5,411,111 | * 5/1995 | Greve ................................... 182/116 |
| 5,950,267 | * 9/1999 | Ricci ....................................... 182/1 |

FOREIGN PATENT DOCUMENTS

| | | | |
|---|---|---|---|
| 22933 | * of 1904 | (GB) .................................... 182/11 |
| 1595995 | * 8/1981 | (GB) .................................... 182/13 |

OTHER PUBLICATIONS

Adapt–A–Bridge, Product of Flight–X Products Corporation, 7 Airport Road, Willard Airport, Savory, Illinois 61874.

Commute–A–Walk, Product of Infra–Structures, Inc., Aviation Products Division, 171 Rodeo Drive, Brentwood, New York 11717.

* cited by examiner

Primary Examiner—Alvin Chin-Shue
(74) Attorney, Agent, or Firm—Moore & Van Allen, PLLC; Scott W. Reid; Michael G. Johnston

(57) ABSTRACT

A portable stairway for use with standard airport boarding bridges is disclosed. The stairway is easily portable as a standalone unit. The stairway also easily connects to and disconnects from the boarding bridge. The type of releasable connection provided between the stairway and the boarding bridge is secure but allows the stairway and the boarding bridge to pivot vertically with respect to one another. Such a connection allows the stairway to be used when the boarding bridge and stairway are not aligned at exactly the same height. When properly connected to the boarding bridge, the stairway provides a smooth transition between the boarding bridge and the stairway and leads from the outer doorway of the boarding bridge to the airplane parking level. Also, while connected to the boarding bridge, the stairway moves freely with the boarding bridge as it is moved about the airplane parking level to service various airplane parking positions.

18 Claims, 7 Drawing Sheets

RELEASABLE, PORTABLE STAIRWAY FOR USE WITH A BOARDING BRIDGE

BACKGROUND

The present invention relates to a portable stairway for use with an airport boarding bridge. The stairway is portable, easily connects and disconnects from the boarding bridge and, while connected to the boarding bridge, moves freely with the boarding bridge as it is moved from location to location.

All modern airports utilize boarding bridges to facilitate loading and unloading passengers from large jet airplanes. A typical boarding bridge is connected to a gate in the airport terminal building and extends outward into the airplane parking area. These gates are usually located in the second level of the terminal—at approximately the same level as the door of a typical modern jet airliner. The boarding bridge is expandable, accordion-style, to extend out to the arriving or departing airplanes. The boarding bridge is also capable of pivoting through a radius to reach the various airplane parking positions serviced by its gate.

When passengers are about to enter or exit an airplane, the outer end of the boarding bridge is driven to a position contiguous to the door of the parked airplane. This may require some vertical adjustment of the end of the boarding bridge due to height variations from airplane to airplane, thus the end of the boarding bridge rides on a mechanism allowing it to be raised and lowered as needed. The end of the boarding bridge mates with the side of the airplane over the airplane door such that passengers may pass directly from one to the other without being exposed to the elements.

This method of entering and exiting airliners has become universal at larger airports and is very desirable. It keeps passengers protected from the weather, it prevents passengers from being exposed to the traffic and other dangers of the busy airplane parking level of the airport and airlines greatly prefer it from a customer-service point of view—it is much more comfortable, and comforting, to stroll down the corridor of a boarding bridge onto the airplane than to trudge across the asphalt of the airport parking level, exposed to the weather, and climb the airplane boarding stairs.

In recent years, airlines have increasingly made use of smaller, "regional" jet airplanes and propeller or "turbo-prop" airplanes to efficiently service shorter routes and to transport passengers from smaller airports to one of the airline's larger hub airports. These airplanes are smaller than the large jet airliners and their doors are much lower to the ground. Due to the size, height, and door and wing configuration of these smaller planes, the modern boarding bridge is incapable of servicing them directly. Passengers of such airplanes have long been forced to disembark onto the tarmac and walk to the terminal. Since the boarding bridges are of no use to these smaller airplanes, some airports have required such planes to park far from the terminal, requiring passengers to walk some distance or be carried to the terminal by shuttle bus. This situation is highly undesirable. In addition to being completely exposed to the weather, passengers traversing the airport parking ramp are exposed to such dangers as vehicular traffic, airplane propellers, jet engine intakes and tripping hazards.

Some partial solutions have been developed over the years. For example, a portable, expandable and covered walkway may be positioned next to an airplane to lead passengers along a protected path across the airplane parking ramp and into the terminal. This device prevents passengers from wandering into danger and protects them from the elements. However, such a device cannot be used with an airport's existing second-level gates and boarding bridges, and requires a completely different parking and loading configuration from that used for the large jets. Passengers are also required to climb terminal building steps into the terminal building.

Another partial solution consists of a gangplank-like device which allows a boarding bridge to interface with some regional planes. Unfortunately, due to the limited length of the gangplank and interference with the engines, this device works only with airplanes whose passenger doors are located behind the wings. This is not true of a majority of these types of airplanes.

Finally, some airports simply place a stairway in front of a boarding bridge and have passengers exit the airplane onto the airplane parking ramp, traverse the ramp and climb the stairs into the boarding bridge. This is an unsatisfactory solution as well. The stairways are not adapted to connect to the boarding bridge in any way and therefore can move or be misaligned creating tripping and falling hazards for the passengers. Also, the stairway must be moved separately and by hand whenever the boarding bridge is moved. This is extremely inconvenient as the boarding bridges are typically re-positioned for every plane. Other airports connect a stairway to the boarding bridge. However, this arrangement prevents movement of the boarding bridge to serve another airplane parking position.

For the foregoing reasons, there is a need for a portable stairway which may be easily connected to and disconnected from a boarding bridge, which will accommodate variations in the height of the boarding bridge and which, when connected to the boarding bridge, will move freely with the boarding bridge.

SUMMARY

Therefore, it is an object of the present invention to provide a stairway for use with a standard boarding bridge which is easily portable as a stand-alone unit.

It is another object of the present invention to provide a stairway which easily connects to and disconnects from a standard boarding bridge.

It is yet another object of the present invention to provide a stairway which, when connected to a boarding bridge, moves freely with the boarding bridge.

It is still another object of the present invention to provide a stairway which, when connected to a boarding bridge, may pivot vertically with respect to the boarding bridge to accommodate variations in the height of the boarding bridge.

Accordingly, there is provided a stairway comprising fixed caster-type wheels under its lower end and retractable wheels under its upper end, making the stairway easily portable as a standalone unit. Once the stairway is connected to the boarding bridge, the wheels under the upper end of the stairway are retracted. Due to the presence of the caster-type wheels under the lower end of the stairway, the stairway may move freely with the boarding bridge as the boarding bridge is moved to accommodate different aircraft positions for loading and unloading passengers.

To create a secure connection between the stairway of the present invention and a boarding bridge, pins are inserted through matching holes provided in the upper end of the stairway and in brackets attached to the frame of the boarding bridge. This arrangement is simple, sturdy and allows the stairway to pivot vertically with respect to the boarding bridge to accommodate small variations in the height of the boarding bridge while maintaining a smooth transition from the top of the stairway into the boarding bridge. This type of connection also allows the stairway to be simply and quickly disconnected from the boarding bridge and wheeled away so that the boarding bridge may return to servicing large jet airliners.

The small gap between the leading edge of the top platform of the stairway and the boarding bridge is covered by a pivoting threshold plate to ensure a smooth walkway and to accommodate any slight difference in height.

As will become apparent below, the present invention addresses several concerns related to loading and unloading passengers of commuter and regional jets with a simple and elegant solution. The present invention provides a portable stairway which may be quickly and easily connected to and disconnected from an existing boarding bridge. The type of connection utilized allows the stairway to accommodate variations in the height of the boarding bridge. While connected, the stairway moves freely with the boarding bridge. This solution allows airports to easily transition an existing boarding bridge from servicing a large airliner to loading a smaller commuter-type plane and back again. The boarding bridge can also be moved from parking place to parking place to service different commuter and regional jet airplanes without disconnecting the stairway from the boarding bridge.

BRIEF DESCRIPTION OF THE DRAWINGS

The accompanying drawings which form a part of the specification, illustrate a preferred embodiment of the present invention. The drawings and description together serve to fully explain the invention. In the drawings, like reference numbers are used to designate the same or similar items throughout the several figures wherein.

DESCRIPTION

Figure 1:
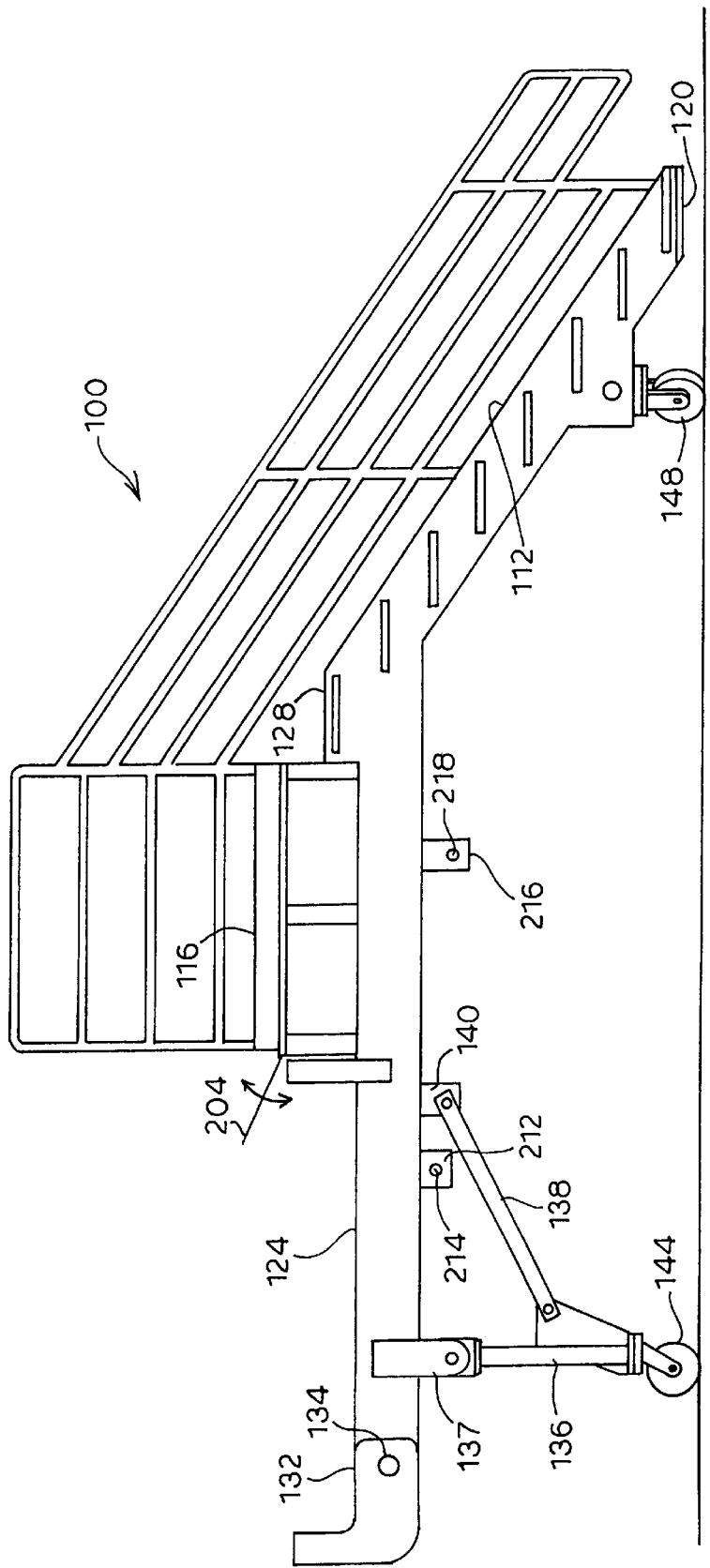
FIG. 1 is a side view of the preferred embodiment of the invention, showing the stairway standing alone with its wheels deployed under its upper end.

FIG. 1 illustrates a side view of an embodiment of a stairway according to the present invention for use with a boarding bridge as it appears standing alone and configured for portability. The stairway, indicated generally at 100, includes at least one flight of steps 112 extending obliquely downward from an upper platform 116 to the lower end 120 of the flight of steps 112.

The upper platform 116 is supported by at least one beam 124 which extends from the upper end 128 of the flight of steps 112, under the upper platform 116, and some distance beyond the upper platform 116. The distal end 132 of the beam 124 has a pin hole 134 which is used in connecting the stairway 100 to the boarding bridge as will be described below.

While the stairway is disconnected from the boarding bridge, the distal end 132 of the beam 124 and the weight of the top half of the stairway is supported by a standard 136. The standard 136 is retractable and may be stored when not needed as will be described below. One end of the standard 136 is rotatably attached to the beam 124 at the bracket 137. When in use, the standard 136 is rotated to a substantially vertical position and extended so that the end of the standard 136 distal from the bracket 137 is adjacent the ground.

Figure 2:
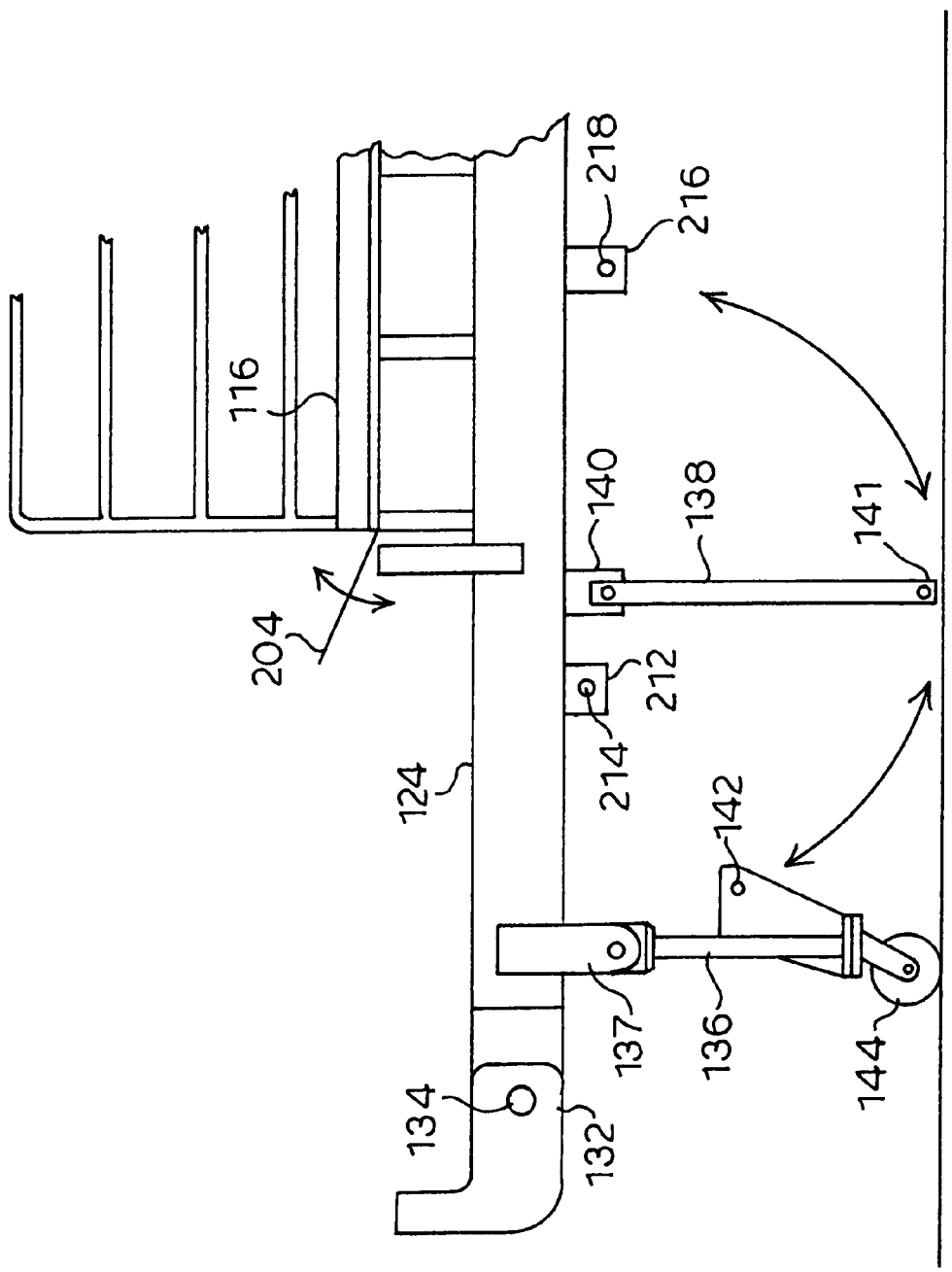
FIG. 2 is a side view of the stairway of FIG. 1 showing the disconnected standard and brace elements in detail.

Once the standard 136 is so positioned, a brace 138 is fixed in place to increase the stability of the structure. Referring now to FIG. 2, one end of the brace 138 is rotatably attached to the beam 124 at the bracket 140. The other end of the brace 138 is provided with a pin hole 141. To support the standard 136, the brace 138 is rotated into position so that the hole 141 is aligned with a hole 142 near the bottom of the standard 136. The connection between the brace 138 and the standard 136 is then secured by sliding a pin (not shown) through the two aligned holes 141, 142.

The lower end of the retractable standard 136 is fitted with a caster 144. The lower end 120 of the flight of steps 112 is also provided with at least one caster 148. As such, the entire stairway 100 is easily movable as a standalone unit.

Figure 3:
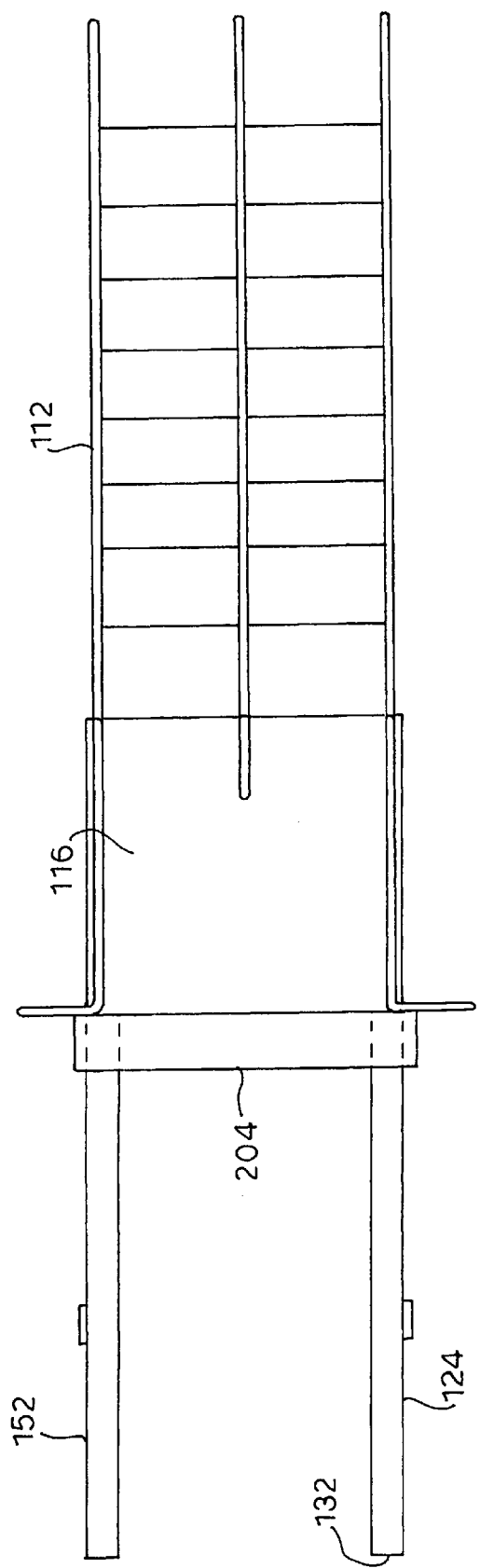
FIG. 3 is a top view of the upper end of the stairway of FIG. 1.

FIG. 3 illustrates a top view of the preferred embodiment of the stairway 100, again, disconnected from the boarding bridge (not shown). From this view, one can see that the preferred embodiment of the stairway of the present invention includes two support beams 124, 152. It is understood that, in this preferred embodiment, the second support beam 152 is provided with a wheeled, retractable standard and brace like elements 136–144 of FIG. 1 even though such elements are not shown in this view.

Figure 4:
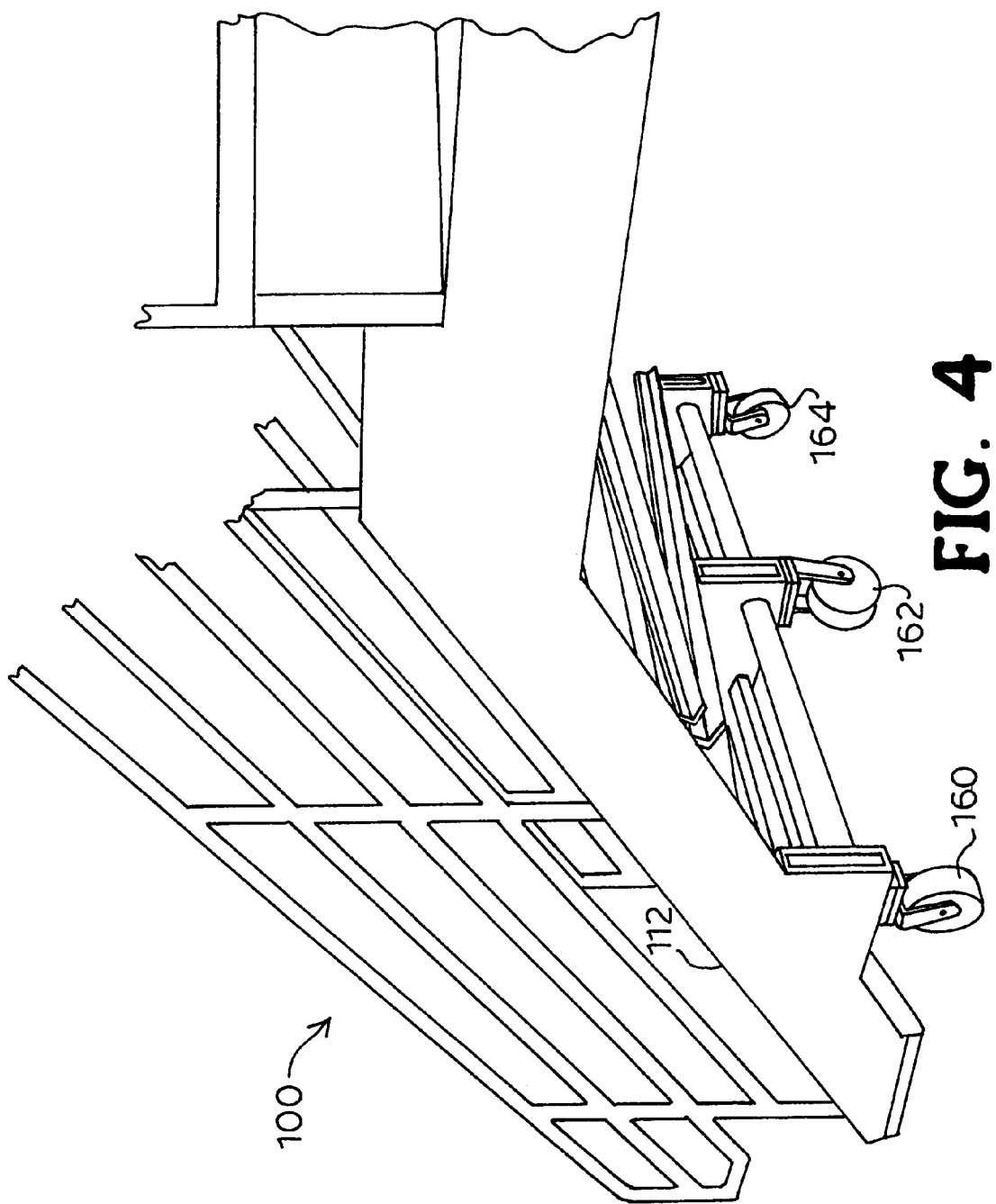
FIG. 4 is a perspective view of the underside of the flight of steps.

FIG. 4 illustrates a view of the underside of the lower end 120 of the flight of steps 112 showing that, in the preferred embodiment, the at least one caster 148 comprises 3 casters 160, 162, 164. However, it is understood that the present invention is not so limited and that differing numbers or types of casters or wheels may be employed to provide the stairway with mobility. The presence of at least two widely-spaced casters in the preferred embodiment provides the stairway with stability and increases the ease with which it may be moved.

Figure 5:
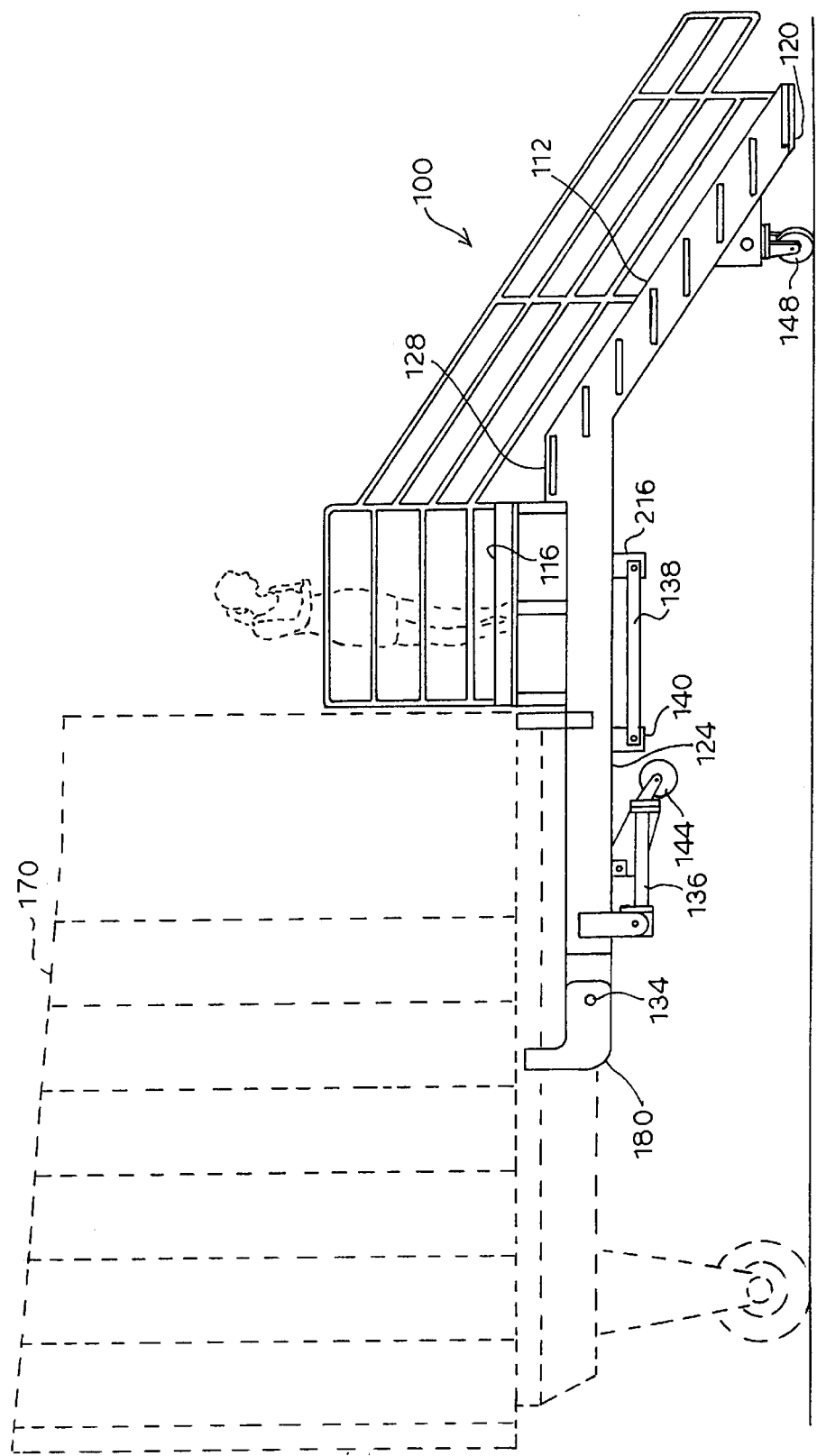
FIG. 5 is a side view of the stairway connected to a boarding bridge with the upper extension wheels retracted.

FIG. 5 illustrates a side view of the stairway 100 as it appears when connected to the boarding bridge, indicated (in dotted-line fashion) generally at 170. To connect the stairway 100 to the boarding bridge 170, the stairway 100 is rolled into position such that the upper platform 116 is aligned contiguous with the doorway of the boarding bridge 170. In this position beams 124 and 152 extend under the frame of the boarding bridge.

Figure 6:
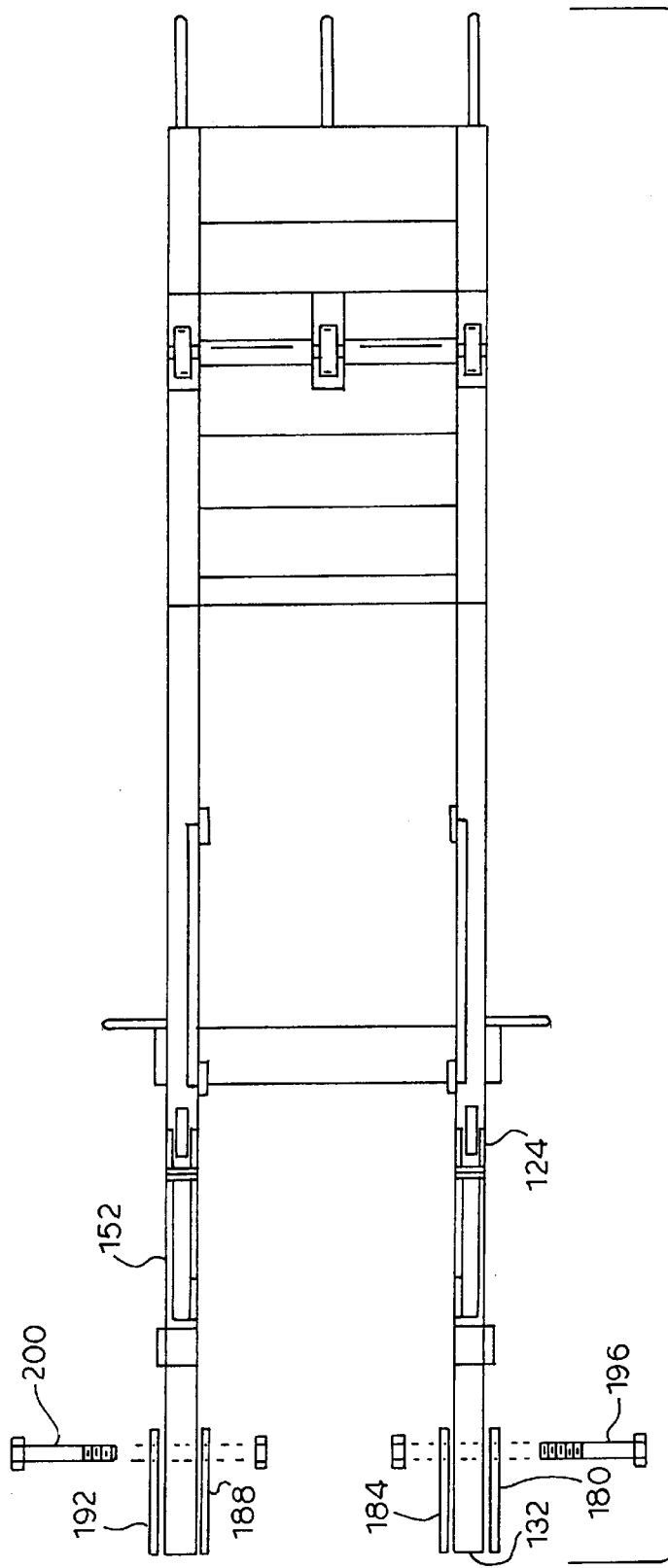
FIG. 6 is a view of the underside of the stairway-boarding bridge connection.

FIG. 5 shows the outside connection bracket 180 associated with beam 124. In FIG. 6, the inside bracket 184 and outside bracket 180 for beam 124 are visible as well as the inside bracket 188 and the outside bracket 192 for the second beam 152 of the preferred embodiment. These brackets are positioned so that, when the upper platform 116 is correctly positioned with respect to the doorway of the boarding bridge, the beam 124 is positioned between the brackets 180 and 184 and the beam 152 is positioned between the brackets 188 and 192. Once positioned, all four brackets of the preferred embodiment are welded, riveted or otherwise fixedly attached to the frame of the boarding bridge.

Figure 7:
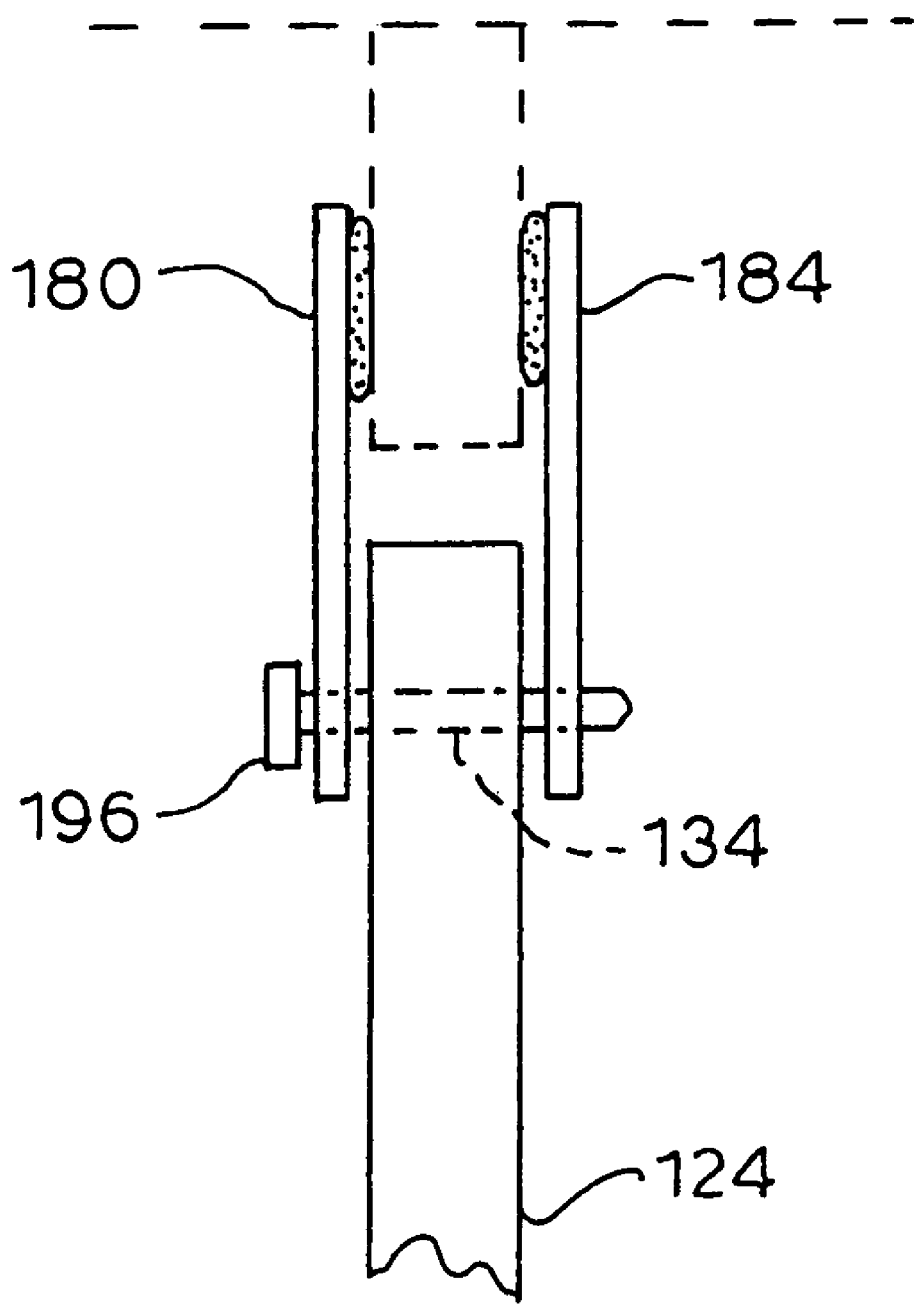
FIG. 7 is a top view close-up of the connection between the boarding bridge brackets and a beam of the stairway.

Referring now to FIG. 7, each connection bracket 180, 184, 188, 192 is provided with a hole adapted and sized to align with the pin hole in the distal end of beams 124 and 152. Once the beams 124 and 152 are aligned with the corresponding holes in the connection brackets, the pins 196 and 200 are inserted through the aligned holes to secure the connections. Once so connected, the boarding bridge 170 and the stairway 100 are securely attached and yet may pivot about the pins with respect to one another. It is understood that the present invention is not limited to the number or type of connections described here in the preferred embodiment but may utilize any other type of secure but pivotable connection.

As the boarding bridge 170 is moved up or down, the pivotable connection of the preferred embodiment accommodates slight variations in the height of the boarding bridge 170 with respect to the stairway 100. This capability lends great flexibility to the system and allows the boarding bridge/stairway apparatus to function though alignment of the boarding bridge 170 with the stairway 100 may be off slightly. To further aid in this regard, the upper platform 116 is provided with a pivoting threshold plate 204 which serves to cover any slight gap between the edge of the upper platform 116 and the doorway of the boarding bridge 170 (See FIG. 1). The pivoting nature of the threshold plate 204 maintains a smooth walking surface for passengers passing between the boarding bridge 170 and the stairway 100 despite any slight vertical misalignment.

Once connected to the boarding bridge 170, the stairway 100 no longer requires the support of the standard 136 and the brace 138. The pin (not shown) is removed from the aligned holes 141, 142 and the standard 136 is retracted into a shortened position and rotated about the bracket 137 to a position substantially parallel with the beam 124 (see FIG. 5). The beam 124 is provided with a storage bracket 212 (FIG. 1) having a pin hole 214. To secure the standard 136 in its storage position, the standard 136 is aligned so that the pin hole 142 is aligned with the hole 214 and a pin (not shown) is inserted through the aligned holes 142, 214.

Similarly, the beam 124 is provided with a second storage bracket 216 for use with the brace 138. When no longer needed, the brace 138 is rotated about the bracket 140 so that the pin hole 141 is aligned with the hole 218 provided in the second storage bracket 216. The brace 138 is then secured in place using another pin (not shown). It is understood that the present invention is not limited to the method of retraction and storage of the standard and brace elements described in the preferred embodiment but may utilize any suitable method of retracting and storing such elements when they are not needed.

While the form of the apparatus herein described constitutes a preferred embodiment of this invention, it is to be understood that the invention is not limited to this precise form of apparatus and that changes may be made therein without departing from the scope of the invention which is defined in the appended claims.

What is claimed is:

1. A portable stairway for leading from the outside doorway of a boarding bridge to the airplane parking level of an airport, the stairway comprising:
 means for connecting the stairway to the boarding bridge, the connecting means allowing for relative vertical pivoting movement of the stairway and the boarding bridge;
 at least one flight of steps extending between an upper end and a lower end of the stairway, the upper end of the stairway adapted to be adjacent the outside doorway of the boarding bridge when the stairway and boarding are connected and the lower end of the stairway adapted to be adjacent the parking level;
 a supporting member movably mounted to the upper end of the flight of steps, the supporting member adapted in a first position to support the flight of steps on the airplane parking level and in a second position to be spaced from the airplane parking level when the flight of steps is connected to the boarding bridge; and
 means associated with the lower end of the stairway for allowing the stairway to move with the boarding bridge when the stairway is connected to the boarding bridge.

2. The stairway of claim 1, wherein the connecting means comprises a releasable connection.

3. The stairway of claim 1 wherein the connection means comprises:
 at least one connecting member extending from an upper end of the stairway and having a hole;
 at least two brackets adapted to be fixed to an underside of the boarding bridge, each having a hole; and
 at least one pin sized to fit through the holes in the connecting member and the at least two brackets;
 the connecting member adapted to fit between the at least two brackets to align the hole in the connecting member with the holes in the at least two brackets to allow insertion of the at least one pin.

4. The stairway of claim 1, wherein the movement means comprises at least one caster associated with the bottom of the lower end of the stairway.

5. In combination;
 a boarding bridge for leading from an airport terminal building to the raised cabin of an aircraft, the boarding bridge having one end attached to the terminal building, a movable second end to be positioned contiguous with the aircraft, a doorway in the second end whereby passengers pass from the aircraft into the boarding bridge and a supporting frame,
 a portable stairway for accessing the ground level from the doorway to the boarding bridge, the stairway comprising:
 a platform adapted to be movably disposed adjacent to the doorway to the boarding bridge;
 at least one flight of steps having an upper end fixed to the platform, said flight of steps extending obliquely downward from the platform and having a lower end adapted to be adjacent the ground level;
 a supporting member movable mounted to the upper end of the flight of steps, the supporting member adapted in a first position to support the flight of steps on the ground level and in a second position to be spaced from the ground level:
 at least one caster attached to the lower end of the flight of steps allowing the stairway to move along the ground in any direction; and
 means for pivotally connecting the platform to the boarding bridge.

6. The stairway of claim 5, wherein the connecting means comprises a releasable connection.

7. The stairway of claim 5, wherein the connecting means comprises a pivotal connection allowing the stairway to pivot in the vertical plane with respect to the boarding bridge.

8. The stairway of claim 5, wherein the connecting means comprises:
 at least one connecting member extending from an upper end of the stairway and having a hole;

at least two brackets adapted to be fixed to an underside of the boarding bridge, each having a hole; and at least one pin sized to fit through the holes in the connecting member and the at least two brackets;

the connecting member adapted to fit between the at least two brackets to align the hole in the connecting member with the holes in the at least two brackets to allow insertion of the at least one pin.

9. A movable stairway for connection to an elevated platform, comprising:

a flight of steps, the flight having upper and lower portions;

a connector attached to the upper portion of the flight of steps and adapted for pivotal and releasable attachment to the elevated platform;

at least one caster connected to the lower portion of the flight of steps for rolling along the surface;

a movable standard having a first and second end, the first end of the standard connected to the upper portion of the flight of steps, the standard having a first position where the standard supports the upper portion of the flight of steps upon the surface and a second position where the standard is spaced from the surface when the connector is attached to the elevated platform; and a caster connected to the second end of the standard for rolling along the surface and which, used in conjunction with the at least one caster connected to the lower portion of the flight of steps, allows for movement of the movable stairway upon the surface while the standard is in the first position and the connector is detached from the elevated platform.

10. The movable stairway of claim 9, wherein the pivotal attachment of the connector allows the flight of steps to pivot in the vertical plane with respect to the elevated platform.

11. The movable stairway of claim 9, wherein the connector comprises:

a rigid member extending from the upper portion of the flight of steps and having a hole;

a bracket adapted to be fixed to the elevated platform and having a hole; and a pin sized to fit through the aligned holes of the rigid member and the bracket when the upper portion of the flight of steps is adjacent the elevated platform for rotation of the rigid member relative to the bracket when the pin is inserted.

12. The movable stairway of claim 9, wherein the first end of the standard is rotatably connected to the upper portion of the flight of steps;

the movable stairway further comprising a brace having a first end and a second end, the grist end of the brace rotatably attached to the upper portion of the flights of steps and the lower end being releasably attachable to the standard at a point intermediate the upper and lower ends for support of the standard while the standard is in the first position.

13. The movable stairway of claim 9, wherein the at least one caster comprises a plurality of casters aligned on an axis for allowing the movable stairway to pivot in the vertical plane with respect to the elevated platform when the standard is in the second position and the connector is attached to the elevated platform.

14. A movable stairway for connection to an elevated platform, comprising:

a flight of steps, the flight having upper and lower portions;

means for releasably and pivotally attaching the flight of steps to the elevated platform;

at least one caster connected to the lower portion of the flight of steps, for rolling along the surface;

a movable standard having a first and second end, the first end of the standard connected to the upper portion of the flight of steps, the standard having a first position where the standard supports the upper portion of the flight of steps upon the surface and a second position where the standard is spaced from the surface when the attaching means is attached to the elevated platform; and a caster connected to the second end of the standard which, in conjunction with the at least one caster connected to the lower portion of the flight of steps, allows for movement of the movable stairway upon the surface while the standard is in the first position and the attaching means is detached from the elevated platform.

15. The movable stairway of claim 14, wherein the attaching means allows the flight of steps to pivot in the vertical plane with respect to the elevated platform.

16. The movable stairway of claim 14, wherein the attaching means comprises:

a rigid member extending from the upper portion of the flight of steps and having a hole;

a bracket adapted to be fixed to the elevated platform and having a hole; and a pin sized to fit through the aligned holes of the rigid member and the bracket when the upper portion of the flight of steps is adjacent the elevated platform for rotation of the rigid member relative to the bracket when the pin is inserted.

17. The movable stairway of claim 14, wherein the first end of the standard is rotatably connected to the upper portion of the flight of steps;

the movable stairway further comprising a brace having a first end and a second end, the first end of the brace rotatably attached to the upper portion of the flights of steps and the lower end being releasably attachable to the standard at a point intermediate the upper and lower ends for support of the standard while the standard is in the first position.

18. The movable stairway of claim 14, wherein the at least one caster comprises a plurality of casters aligned on an axis for allowing the movable stairway to pivot in the vertical plane with respect to the elevated platform when the standard is in the second position and the attaching means is attached to the elevated platform.

* * * * *